United States Patent [19]
Musgrave

[11] 3,964,199
[45] June 22, 1976

[54] ADJUSTABLE SPRING ASSEMBLY
[76] Inventor: Daniel D. Musgrave, 8201 Caraway St., Cabin John, Md. 20731
[22] Filed: June 2, 1975
[21] Appl. No.: 582,772

[52] U.S. Cl. .................................. 42/50; 267/165
[51] Int. Cl.² ...................... F41C 25/02; F16F 1/22
[58] Field of Search ................. 42/50, 49, 7, 18, 22; 267/158, 160, 164, 165, 85, 86, 87, 89

[56] References Cited
UNITED STATES PATENTS
1,044,983  11/1912  Brown.................................... 42/50
1,893,098  1/1933  Murray, Sr. et al. ................ 267/165
3,039,221  6/1962  Musgrave................................ 42/50

Primary Examiner—Charles T. Jordan

[57] ABSTRACT

An adjustable spring assembly which can be installed in a no-load condition in a minimum space. When the spring is to exert thrust, some parts are moved relative to others so as to cause mutual interference tending to expand the assembly. One suggested use for this type of spring assembly is in cartridge magazines for firearms.

10 Claims, 8 Drawing Figures

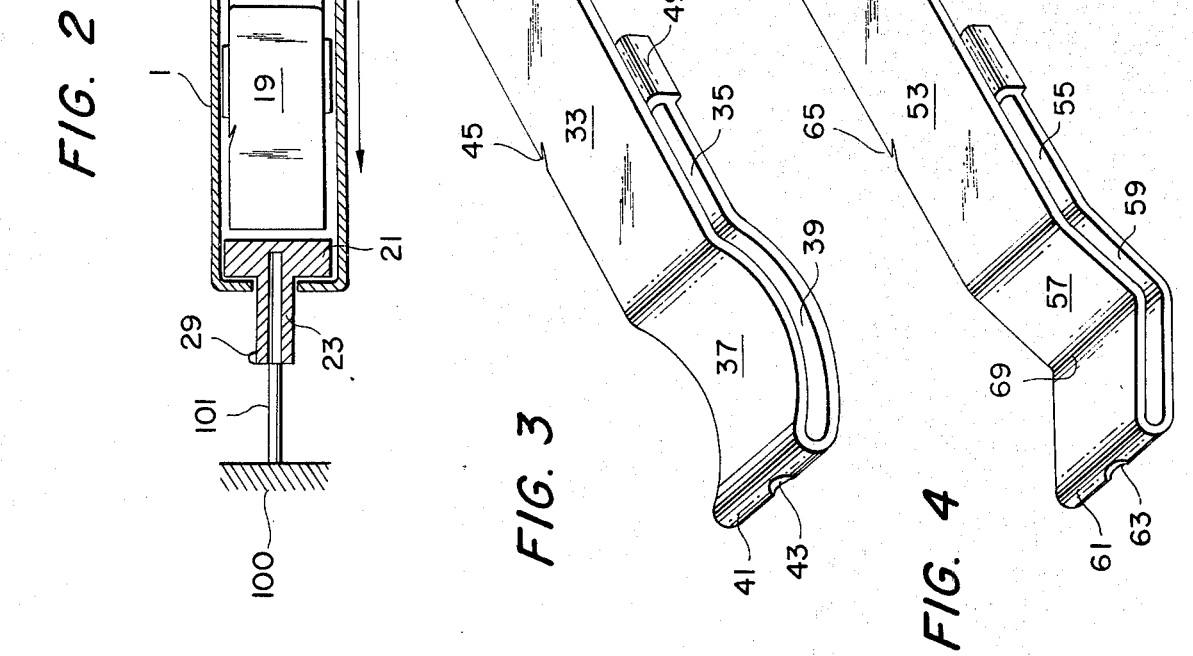
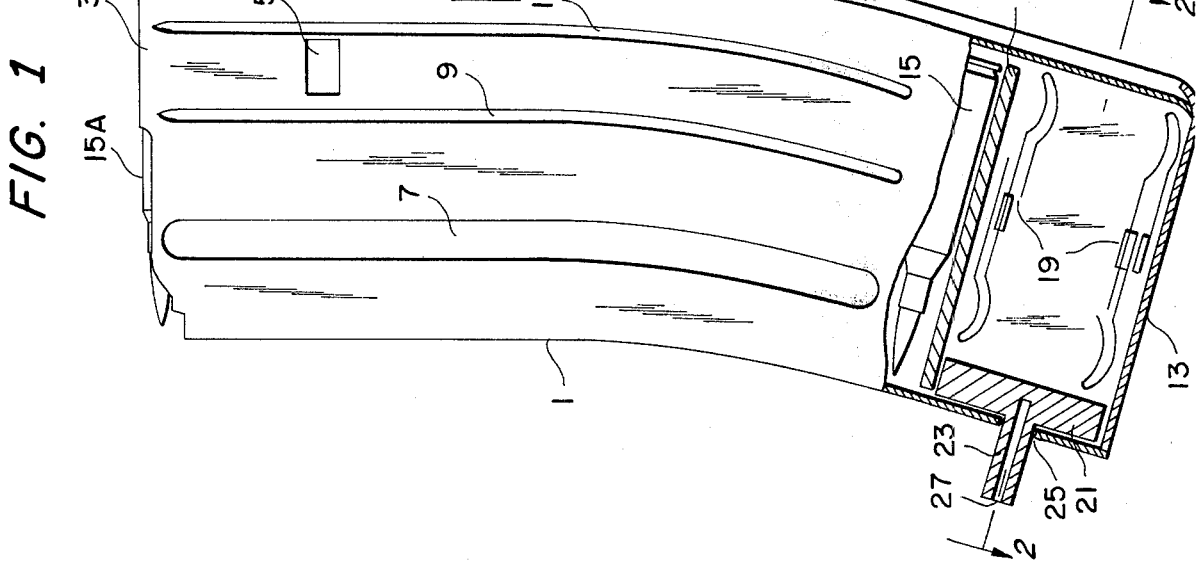

U.S. Patent June 22, 1976 Sheet 2 of 2 3,964,199
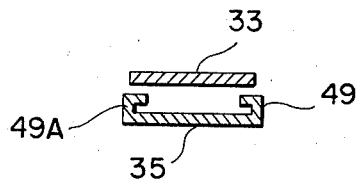
FIG. 5
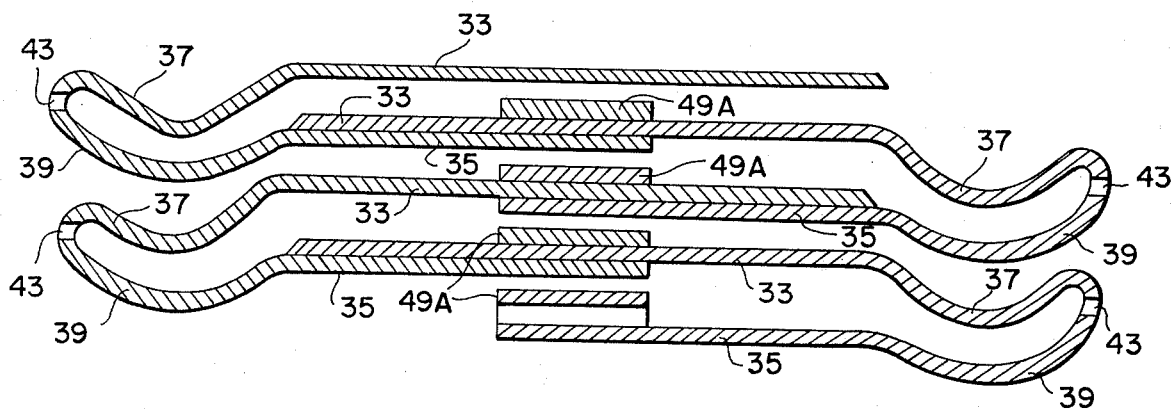
FIG. 6
FIG. 7
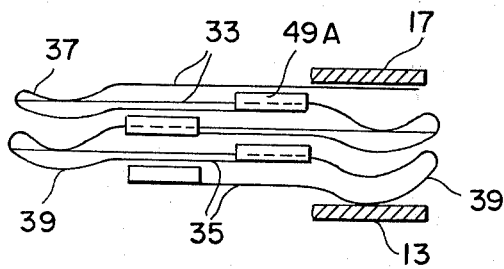
FIG. 8
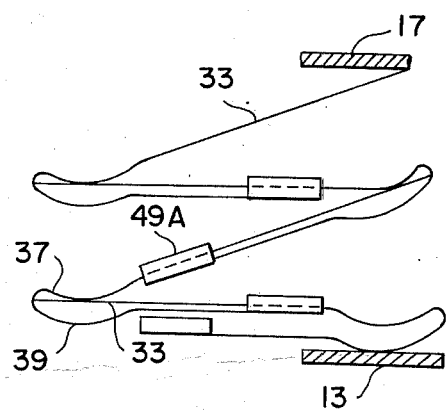

ADJUSTABLE SPRING ASSEMBLY

Many types of equipment include springs which must stand by in a stressed condition for long periods of time. An obvious limitation on such equipment is the possibility that the springs may lose their resilience. A special instance of this problem is the cartridge magazine for firearms, which therefore is usually not filled until use is imminent. This requires separate storage and handling of the cartridges and the magazines.

It would be a considerable advantage if the magazines could be filled at a central point, wrapped in a protective material, and not unwrapped until just prior to use. The shelf life of carefully made ammunition is normally 20 years or more, but the typical wire coil magazine spring will not endure, under load, for such a length of time.

It is an object of this invention to provide an adjustable spring assembly which can be installed in a minimum space in a no-load condition, and can quickly be adjusted to a loaded condition.

This and other objects of the present invention will become apparent upon reference to the following specification, taken in connection with the accompanying drawings, wherein:

FIG. 1 is a side elevation, partly sectioned, of a cartridge magazine incorporating an ajustable spring assembly.

FIG. 2 is a longitudinal section taken in the plane 2—2 on FIG. 1.

FIG. 3 is a perspective view of a folded leaf spring.

FIG. 4 is a perspective view of another type of folded leaf spring.

FIG. 5 is a cross-section, taken near the end of the short leaf, on either FIG. 3 or FIG. 4.

FIG. 6 is a section of several folded leaf springs assembled together in a no-load state.

FIG. 7 is a schematic sketch showing the relationship of the several springs in FIG. 6, after they have been moved into mutual interference.

FIG. 8, also a schematic sketch, shows the same group as FIG. 7, but the assembly has expanded.

It is desired to point out that the illustrations are for purpose of disclosure, and that they should not be considered limiting. This invention will be useful in cartridge magazines such as that shown, and in various other types of equipment.

Referring to the drawings in detail, there is shown in FIG. 1 a cartridge magazine 1, of the well-known type. The magazine has the usual feed lips, one of which is seen at 3, and a hole 5 in one side wall wherein is engaged a latching mechanism when the magazine is attached to a firearm. The side wall also has typical stiffening grooves 7, 9 and 11, which do not extend completely to the bottom of the magazine. A floor plate 13 is affixed to the magazine in the usual manner.

In FIG. 1, the lower portion of the side wall of the magazine is cut away thus exposing a cartridge 15, resting on a follower or platform 17 in the usual manner. Another cartridge, 15A, is partly visible under feed lip 3. The follower is engaged with an adjustable spring assembly, the extent and location of which is indicated at 19. The spring assembly is disposed between follower 17 and floor plate 13, but it does not occupy the said space completely. In the said space, at the front of the magazine, is placed a pusher block 21 having a lug 23 extending out of the magazine through a hole 25 in the front wall of the magazine. A hole 27 is formed in lug 23, and a stud 29 is formed on its exterior to prevent it from entering completely into the interior of the magazine.

FIG. 2 also shows the disposition of the spring assembly and pusher block. Although the magazine is here illustrated without stiffening grooves in its lower portion, in actual practice these might be carried down to the bottom with decreasing depth to avoid interference with the pusher block or the spring assembly.

FIG. 3 shows a folded leaf spring 31 having flat portions 33 and 35 and arcuate portions 37 and 39 which are joined by a vertex 41. Formed in vertex 41 is a hole 43 and formed on the edge of flat portion 33 is an angular notch 45.

The end of flat portion 33 is slightly beveled as shown at 47. The end of flat portion 35 has a pair of inwardly turned flanges 49 and 49A formed thereon. This may be seen clearly in FIG. 5 which is a cross-section of the folded leaf spring near the end of flat portion 35.

FIG. 4 shows a folded leaf spring 51 having flat portions 53 and 55 and arcuate portions 57 and 59 which are joined by a vertex 61. Formed in vertex 61 is a hole 63 and formed on the edge of flat portion 53 is an angular notch 65. Leaf spring 51 is similar in cross-section near the end of flat portion 55, to leaf spring 31, already described. The end of flat portion 51 is slightly beveled at 67.

FIG. 5 which is a cross-section of leaf spring 31 also applies to leaf spring 51, although the part numbers do not apply to spring 51.

It will be noted upon comparing FIGS. 3 and 4 that the arcuate portions of the springs differ. Spring 51 has these portions somewhat like a pointed arch with a well defined valley at 69. Other configurations may be employed as will be understood from the further description following.

FIG. 6 shows a sectional view of a spring assembly similar to that indicated at 19 in FIG. 1. The assembly consists of a stack of folded leaf springs of the type disclosed in FIG. 3. The stack is assembled with each long flat portion 33 inserted into the channel formed by flanges 49 and 49A on flat portion 35 of an adjacent spring. The assembly is shown in the no-load condition, as flat portions 33 are only partly inserted into the channels. There is no tendency for the assembly to expand, and it accupies a minimal space. It should be noted that, for clarity, the components have been drawn with some space between them. In actual practice they would be relatively closer together. The drawings are for purpose of disclosure and, of course, are not to scale.

When it is desired to have the spring assembly exert thrust the position of some components are moved relative to others. This is accomplished in the magazine 1 in FIG. 1 by pushing block 21 inward against the spring assembly. Various conventional methods can be used to accomplish this. In FIG. 2, the entire magazine can be pushed against a rod 101 mounted on a fixed surface 100, which might be part of the firearm with which the magazine is to be used. To guide the movement of the block, the rod may be entered into hole 27 in lug 23 of the block. The block must be capable of a certain predetermined movement as will be understood below. Stud 29 is provided to insure that the block is not pushed completely inside the magazine.

FIG. 7 shows schematically the condition of the spring assembly after movement of the block against it. The ends of the flat portions of the folded leaf springs have been inserted between the pairs of arcuate portions of adjacent springs, and acting as wedges, have tended to separate them. As the vertices are weakened by holes 43, the folded springs will tend to open, and increase the angle between flat portions 33 and 35 of each spring. This tendency results in a thrust against follower 17 and a reaction against floor plate 13. It should be reiterated that FIG. 7 is schematic, and that it is not intended to show every detail of the complex curves which will appear in the assembly when so stressed.

As considerable friction will be encountered when changing the assembly from the condition shown in FIG. 6 to that shown in FIG. 7, it may be desirable to coat the springs in the stack with a substance having a low coefficient of friction.

FIG. 8 shows schematically the condition of the assembly in FIG. 7 when it is permitted to expand vertically. This would be the result in FIG. 1, for example, as cartridges are removed from the magazine. The assembly is thrusting follower 17 upward in a direction away from floor plate 13. It should again be stated that FIG. 8 is schematic and does not shown the actual complex curves which would appear in the actual stressed spring.

When the spring assembly is in the condition shown in FIGS. 7 and 8, with the ends of the long flat portions of the folded leaf springs inserted between pairs of arcuate portions of adjacent springs, there may be some tendency for the assembly to return to the condition illustrated in FIG. 6. This would render the assembly inoperative. To prevent such an occurrence a detent is provided on each folded leaf spring. The detent, in the form of a notch, is shown at 45 in FIG. 3 and at 65 in FIG. 4.

When the long flat portions of the folded leaf springs are inserted between pairs of arcuate portions as disclosed in FIG. 7, the notch has traveled past flange 49A, and the pointed portion of material on the outside of the notch will engage the surface of the flange and function as a detent.

If it is desired to have the spring assembly expand along a curve, such as the path of follower 17 in FIG. 1, a different degree of curvature can be given to the arcuate portions at each end of the stack. Many variations are thus possible.

There is thus disclosed a simple adjustable spring assembly which can remain in a no-load condition for long periods, and yet can be activated instantly when needed. It is desired to emphasize that the disclosed embodiement is exemplary only, and should not be considered limiting.

What I claim is:

1. An adjustable spring assembly comprising: a stack of interleaved folded leaf springs each having a pair of parallel flat portions extending from a pair of nested arcuate portions connected by a vertex, each successive spring being positioned with its vertex disposed at an opposite end of said stack; means for engaging each interleaved flat portion of one of said springs with an adjacent flat portion of another of said springs; and means for inserting wedge means between each said pair of arcuate portions thereby separating said pair and tending to expand said stack in a direction substantially perpendicular to the major flat plane of said flat portions.

2. An adjustable spring assembly as set forth in claim 1 further characterized by the recited wedge means comprising some flat portions of said folded leaf springs.

3. An adjustable spring assembly as set forth in claim 1 further characterized by one of each said pair of parallel flat portions being longer than the other of said pair.

4. An adjustable spring assembly as set forth in claim 1 further characterized by the cross-sectional area of said vertex being reduced in relation to the cross-sectional area of said arcuate portions.

5. An adjustable spring assembly as set forth in claim 1 further characterized by said means for engaging each said interleaved flat portion of one of said springs with an adjacent flat portion of another of said springs being adapted to permit relative sliding motion between said two engaged flat portions.

6. An adjustable spring assembly as set forth in claim 1 further characterized by detent means associated with said wedge means and adapted for retaining said wedge means in position when said wedge means is inserted between each said pair of arcuate portions.

7. An adjustable spring assembly as set forth in claim 1 further characterized by the pairs of arcuate portions at one end of said stack being dissimilar from the pairs of arcuate portions at the other end of said stack.

8. An adjustable spring assembly as set forth in claim 1 further characterized by the said arcuate portions having a profile substantially similar to a pointed arch.

9. An adjustable spring assembly as set forth in claim 1 further characterized by each spring in said stack being coated with a substance having a low coefficient of friction.

10. A firearm magazine comprising: a case for storing cartridges having a pair of lips with an exit port therebetween; a floor; a follower for engaging said cartridges; an adjustable spring assembly positionally adapted for engaging said follower and for reacting against said floor and comprising, a stack of interleaved folded leaf springs each having a pair of parallel flat portions extending from a pair of nested arcuate portions connected by a vertex, each successive spring being positioned with its vertex disposed at an opposite end of said stack, means for engaging each interleaved flat portion of one of said springs with an adjacent flat portion of another of said springs, and means for inserting wedge means between each said pair of arcuate portions thereby separating said pair and tending to expand said stack in a direction substantially perpendicular to the major flat plane of said flat portions.

* * * * *